US006260206B1

(12) United States Patent
MacDonald et al.

(10) Patent No.: US 6,260,206 B1
(45) Date of Patent: Jul. 17, 2001

(54) TEMPERATURE REGULATING MODULAR HAT

(76) Inventors: Alexandra MacDonald, HC30 Box 797F, Prescott, AZ (US) 86301; Lisa Grace, 1735 Yorktown Rd., San Mateo, CA (US) 94402

( * ) Notice: Subject to any disclaimer, the term of this patent is extended or adjusted under 35 U.S.C. 154(b) by 0 days.

(21) Appl. No.: 09/209,592

(22) Filed: Dec. 11, 1998

Related U.S. Application Data

(62) Division of application No. 08/752,355, filed on Nov. 19, 1996, now Pat. No. 5,875,493.

(51) Int. Cl.[7] .................................................... A42B 1/00
(52) U.S. Cl. ..................................... 2/181; 2/171; 2/181.6
(58) Field of Search ......................... 2/181, 181.6, 181.8, 2/171, 171.1, 202, 209.12, 410, 422, 918

(56) References Cited

U.S. PATENT DOCUMENTS

| 1,481,541 | 1/1924 | Douglas | 2/116 |
|---|---|---|---|
| 2,844,822 | 7/1958 | Persico et al. | 2/172 |
| 2,859,448 | 11/1958 | Gaichel | 2/199 |
| 2,897,510 | * 8/1959 | Forbes-Robinson | 2/181 |

(List continued on next page.)

OTHER PUBLICATIONS

Advertisement: Bula (R) Outdoor, *Outfitter Magazine* Nov., 1995, p. 23, "White Water Natural Nylon Cap".

(List continued on next page.)

*Primary Examiner*—Diana Blefeld
*Assistant Examiner*—Katherine Moran

(57) ABSTRACT

The Modular Head Covering System includes a temperature regulation module, an insect-excluding module and a rain cover module. The temperature regulation module can include the following components: a head-encircling member such as a headband, to which a visor, a scarf-like headcover, and a pair of side flaps can be detachably attached in varying combinations for shade, regulation of body heat, and insulation. The headcover attaches within a pocket built into the section of the head-encircling member that crosses the forehead of the wearer. Two notches are cut into the headcover, one on each side, where the pocket ends at approximately the temples of the wearer. Notches allow the attaching edge of the headcover to be fastened within the pocket, and the rest of the headcover to be positioned either over (on the outside of) the head-encircling member or under (on the inside of) the head-encircling member. Thus, these two components function independently of one another across the back of the wearer's head. The side flaps also fasten within pockets built into the head-encircling member, one on each side. Because of their particular two-piece construction they can open, close, and overlap in the back, and move forward and backward. The insect cover module is designed to provide an insect-proof environment for the head, neck, and upper torso and to function comfortably when worn with a backpack-like device. The rain cover module is designed to prevent precipitation from contacting the head, neck, and shoulders of the wearer and to present no seams to direct precipitation. The insect cover module and the rain cover module rest upon and depend from the top of the visor, which holds them away from the wearer's face. Either can be used in conjunction with the temperature regulation module. Thus, the components and modules can be employed in varying combinations as weather and environmental conditions require.

3 Claims, 14 Drawing Sheets

U.S. PATENT DOCUMENTS

| | | | |
|---|---|---|---|
| 2,963,708 | * | 12/1960 | Herbine et al. .......................... 2/181 |
| 3,480,970 | | 12/1969 | Gettlinger ................................ 2/207 |
| 3,671,977 | | 6/1972 | Degnon .................................... 2/207 |
| 4,023,212 | | 5/1977 | Huffman .................................. 2/197 |
| 4,277,847 | | 7/1981 | Florio ........................................ 2/12 |
| 4,395,781 | | 8/1983 | Myers .......................................... 2/4 |
| 4,630,317 | | 12/1986 | Brown et al. .............................. 2/12 |
| 4,821,341 | * | 4/1989 | Baptiste ..................................... 2/10 |
| 4,887,317 | | 12/1989 | Phillips et al. .......................... 2/243 |
| 4,980,928 | | 1/1991 | Ellis ........................................... 2/88 |
| 5,048,128 | | 9/1991 | Watson .................................... 2/204 |
| 5,070,545 | | 12/1991 | Tapia ....................................... 2/195 |
| 5,083,317 | | 1/1992 | DeMorets ................................ 2/174 |
| 5,091,995 | | 3/1992 | Oates ....................................... 2/195 |
| 5,099,524 | | 3/1992 | Linday ..................................... 2/181 |
| 5,212,837 | | 5/1993 | Gose et al. .............................. 2/172 |
| 5,293,646 | | 3/1994 | Winston ..................................... 2/88 |
| 5,323,491 | | 6/1994 | Barrett ..................................... 2/207 |
| 5,790,986 | * | 8/1998 | Hall ......................................... 2/172 |
| 5,887,287 | * | 3/1999 | Potochnik ........................... 2/209.13 |
| 5,901,370 | * | 5/1999 | Linday ....................................... 2/10 |
| 5,983,398 | * | 11/1999 | Kronenberger .......................... 2/181 |
| 5,996,124 | * | 8/1999 | Asp, Jr. .............................. 2/209.13 |

OTHER PUBLICATIONS

*The Boundary Water Catalog: Canoeing and Camping Edition,* 1995 pp. 6. "Save–Your–Skin Hat".

*Travel Smith Outfitting Guide and Catalog,* Holiday 1995, p. 27, Sequel, "Desert Cap".

*Sun Precautions* catalog, 1996, pp. 17, "adult shade cap".

\* cited by examiner

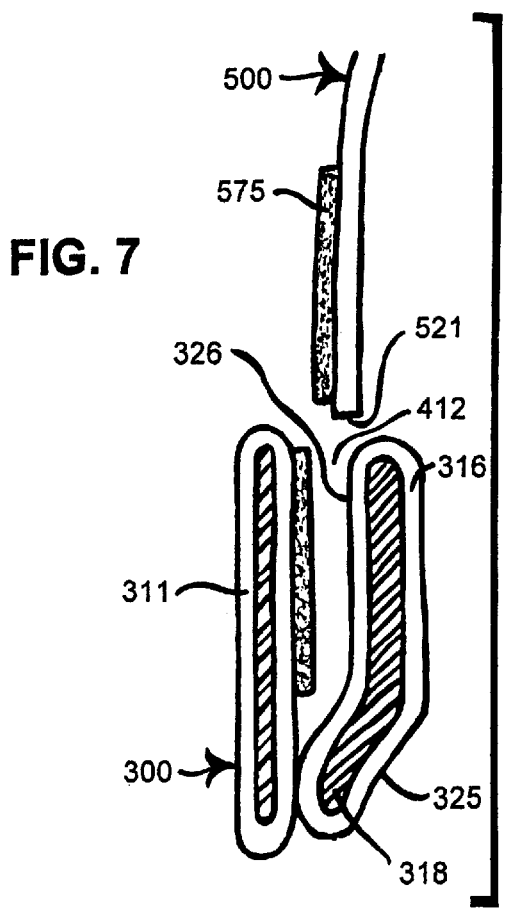
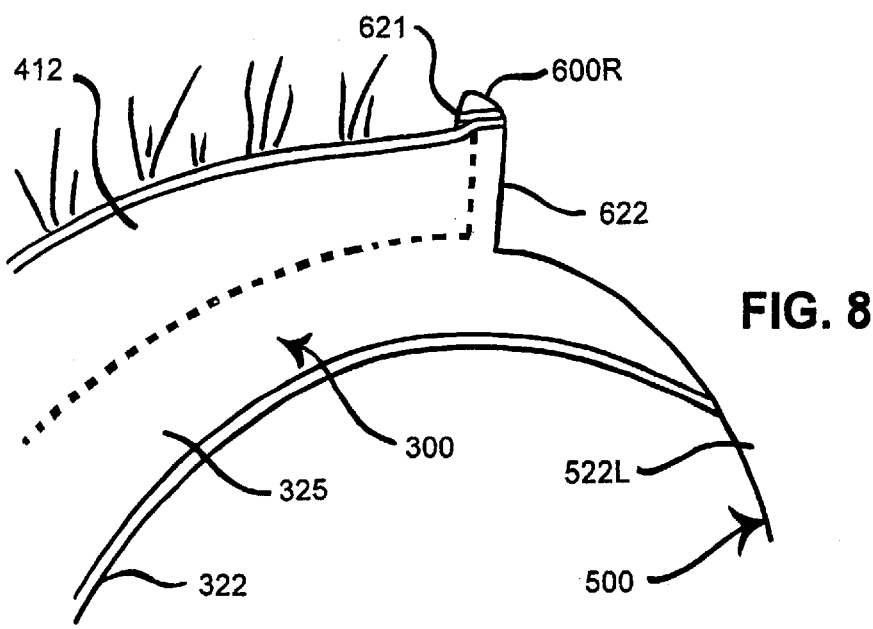

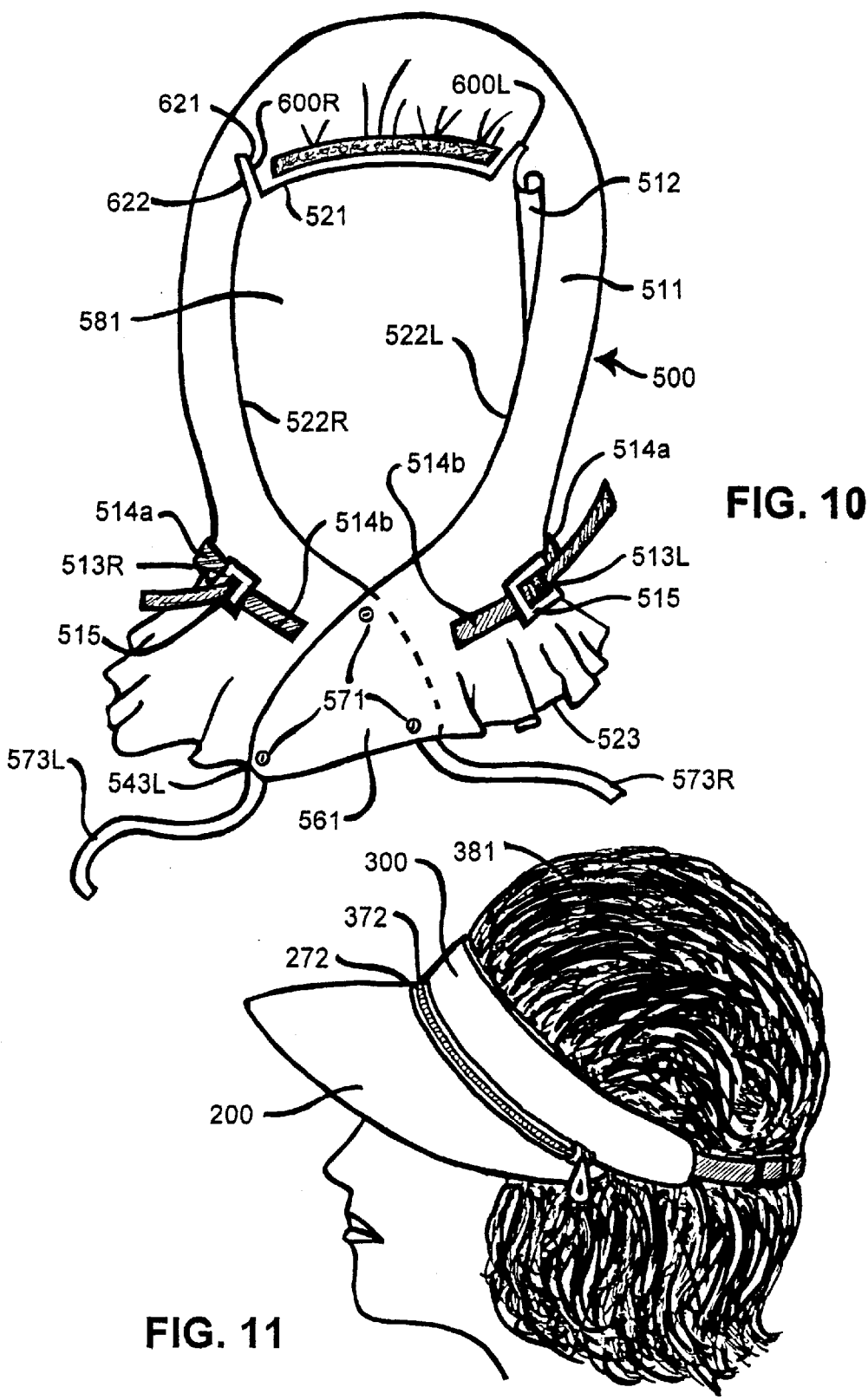

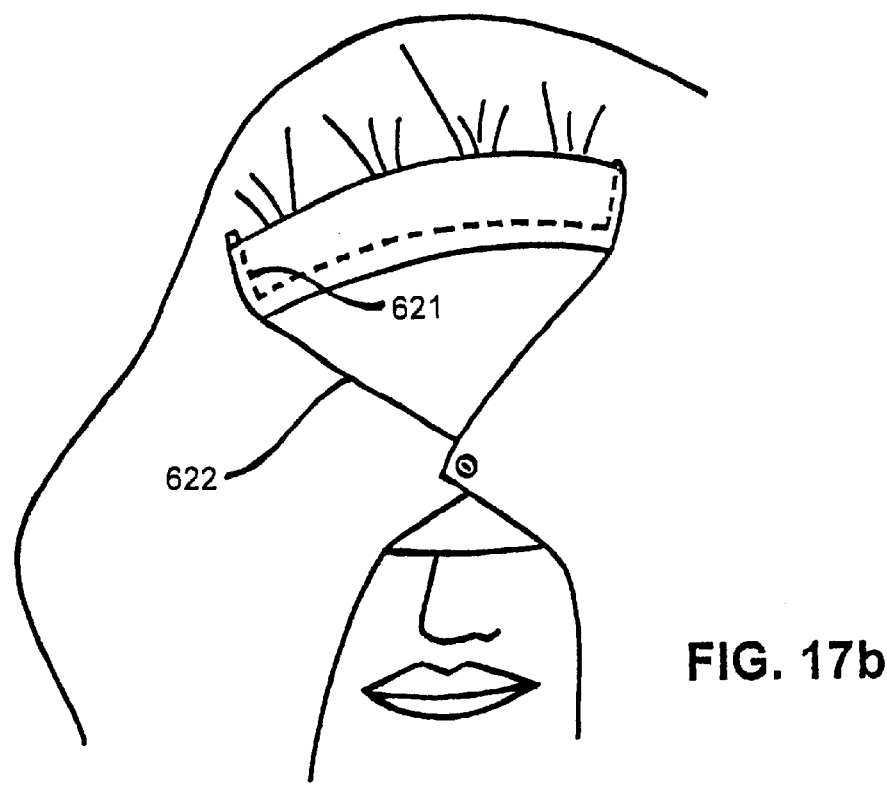
FIG. 17b
FIG. 17a
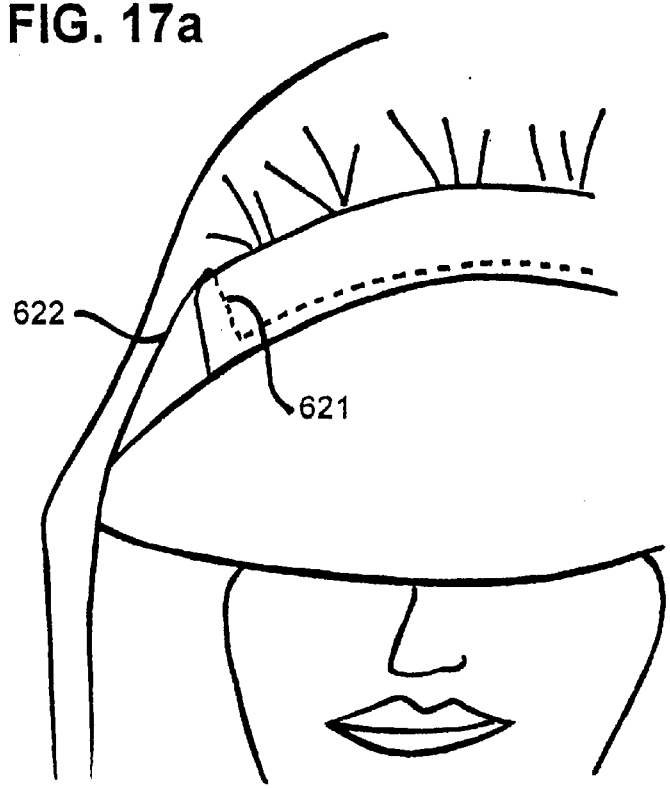

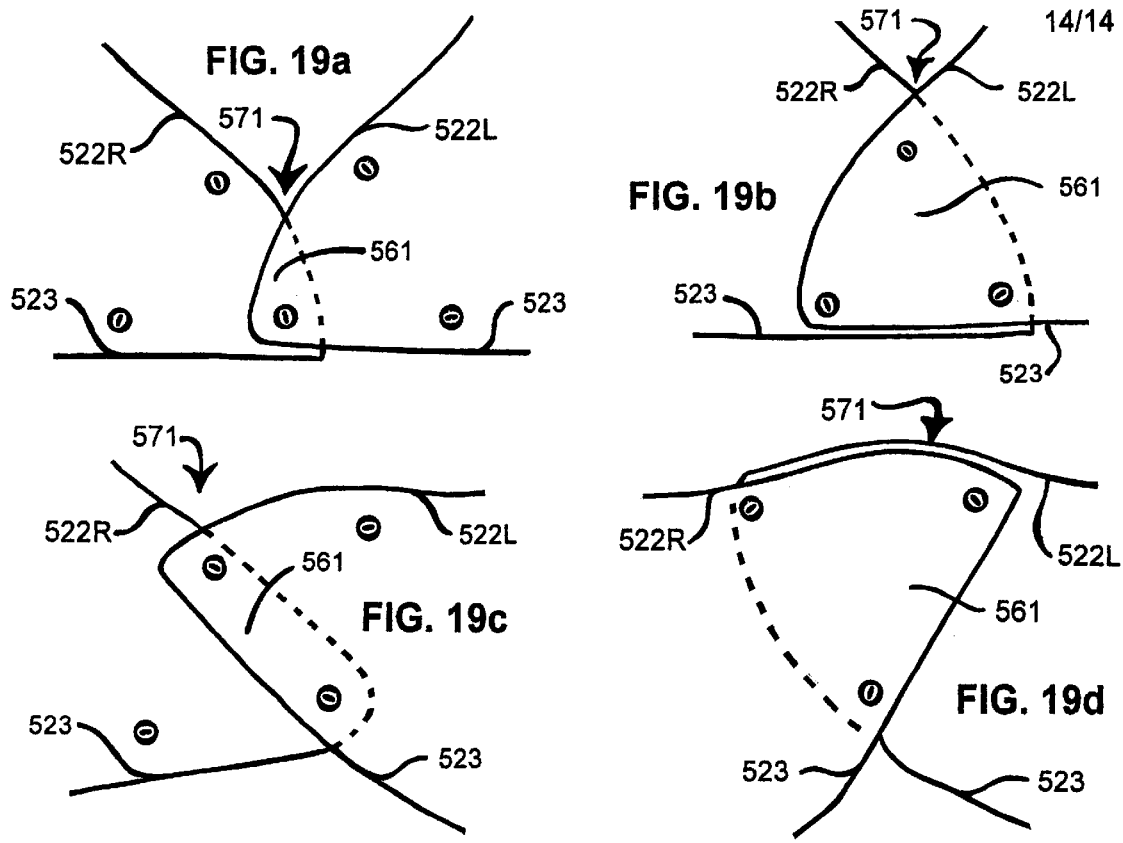
FIG. 19a
FIG. 19b
FIG. 19c
FIG. 19d
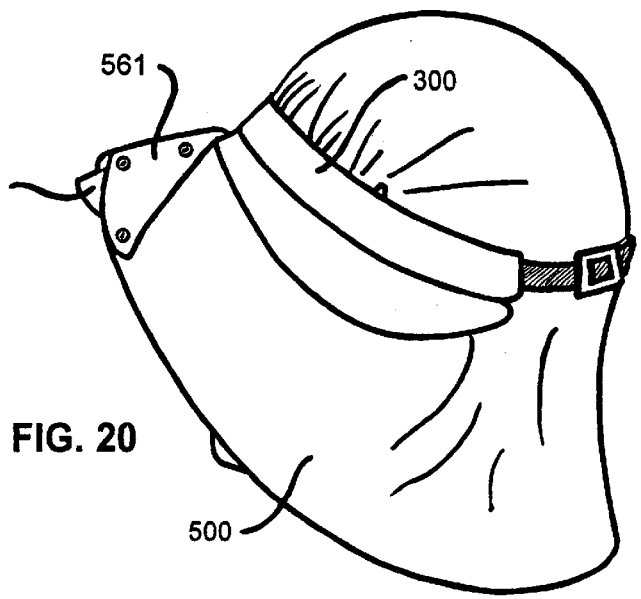
FIG. 20

TEMPERATURE REGULATING MODULAR HAT

This application is a Division of Ser. No. 08/752,355 filed Nov. 19, 1996 now U.S. Pat. No. 5,875,493.

BACKGROUND—FIELD OF INVENTION

This invention pertains to a modular system of head coverings. More particularly, the invention pertains to a light-weight, easy to pack grouping of components that work together in combinations to provide protection to a person's head, neck, and throat from the damaging effects of exposure to sun, wind, dust, heat, cold, insects, and precipitation.

BACKGROUND—DESCRIPTION OF THE PRIOR ART

The prior art shows many head coverings. Most are designed for a single kind of use. Consequently, a person who wears hats needs many of them in order to be prepared for all eventualities. This is particularly true for people who work or recreate in the out-of-doors.

A modular or combination all-in-one head covering system was not discovered in the prior art. Also, in the field of outdoor recreation, the manufacturers have not produced an all-inclusive system. The use of a plurality of hats, each for a different condition, is ineffective and impractical for weight-conscious backpackers and travelers. In addition, people are becoming more environmentally conscious and concerned about the health impacts of sun exposure, insect bites, and heat and cold related illness.

The prior art discloses numerous head coverings that provide shade. However, not one has succeeded in providing sun protection to all areas of the head, neck, throat, and face regardless of the angle of the sun. Given the deleterious effects of sun exposure, a head covering is needed that conveniently offers a variety of options in response to differing qualities and angles of sunshine.

People who work or recreate outdoors encounter a variety of ever-changing environmental circumstances. These people need a comprehensive easy-to-use system for protection of the head, neck, and throat. Such a system has not yet been developed. The present invention seeks to address these and other deficiencies.

The most common sort of head covering is the baseball cap. These hats shade the eyes and offer limited protection for the rest of the face depending on the angle of the sun. Baseball caps have a fixed crown depth even if the cap's head-encircling member is adjustable. Some baseball caps have crown coverings which are separable or convertible. However, the beneficial effects of this versatility are limited to the top of the wearer's head.

Head coverings of the scarf or veil type with an attached visor provide some shade and insulation to the head and back of the neck. However, to secure them, the wearer must tie them to his or her head using strings attached on or near the visor or the corners of the scarf itself. This pulls back and flattens the visor and scarf leaving the sides of the face and neck exposed. A sun and wind protective scarf or veil detachable from an independently functional head-encircling member and visor was not found in a search of the prior art. A scarf-like head cover combined with a double flapped component was also not found in the prior art.

Caps with flaps, detachable or permanently attached, are known in the prior art. However, prior art shows no examples of side flaps which can be moved forward or backward to create more or less shade on the face and to offer protection to the nose and mouth. Also, all side flaps found in the prior art were either of one-piece construction or too small to create adequate shade except directly on the ears.

Also not found in the prior art are side flaps or scarf-like head coverings designed to function co-operatively with other components and modules in a comprehensive head covering system.

In the prior art of head garments for protection from biting insects, we find hooded garments, head nets, or hats with devices to keep the fabric up or off the skin. The hooded garments necessitate wearing the entire garment to protect the head if the hood is not detachable. Those that classify as head nets do not provide for easy access to the wearer's face unless one removes the entire head covering. Also, prior art does not disclose an insect-excluding head covering designed to provide the wearer with some control over ventilation or heat retention. Prior art also does not disclose an insect-excluding garment for the head and upper torso that is effective when worn with a backpack-like carrying device.

Further, the prior art does not disclose an insect-excluding head covering that is designed to function co-operatively with other modules in a comprehensive head covering system.

The prior art is replete with garments to protect the head from precipitation. Most common are hoods. Hoods drain water onto the shoulders of the user's coat. Eventually, water can saturate the fabric creating leaks, especially if any seams are exposed. Hoods are usually attached to coats which limits their mobility. This is because a hood stays in one position even if the head is rotated. Turning one's face to the side while wearing a hood can cause the sides of the face and the hair to get wet, a condition that is not only uncomfortable, but may contribute to hypothermia.

In the art of rain hats, most common is the wide-brimmed waterproof version of a cowboy-style hat. If the brim is not wide enough, these hats tend to drain water right down the back of the wearer's neck. If the brim is wide enough, it presents a different set of problems. Wide-brimmed hats must be removed to comfortably sit where space is limited behind the head, such as in a car or truck seat or when a backpack is worn.

Other attempts at waterproof head coverings include the umbrella-like modification of a hat or cape. These require additional parts or contraptions that make them cumbersome or impractical for the traveler or adventurer. Also, hooded cape-like rain gear is not practical for a person wearing a backpack.

Technological advances in the textile industry have produced many waterproof fabrics. Unfortunately, wherever a needle penetrates the fabric the waterproof properties are compromised and, if the seams will be exposed to direct precipitation they require sealing. The sealing process can be done by hand, which is inexpensive but time consuming, or by a seam sealing mechanism. Even sealed seams can eventually be compromised. A search of the prior art revealed no rain protective garments constructed so that no seams are presented to direct precipitation.

Finally, the prior art does not disclose a waterproof garment designed to function with other modules in a comprehensive head covering system.

Note to the Reader

This invention comprises three modules, one of which comprises four components. We have chosen, for the sake of clarity, to refer to these parts in the following way:

a) the word "module" refers to one of the three basic units that comprise the Modular Head Covering System: the temperature regulation module, the insect cover module, and the rain cover module, and b) the word "component" refers to one of the four basic units that comprise the temperature regulation module: the visor, the headband, the headcover, and the side flaps.

OBJECTS AND ADVANTAGES

The main object of the invention is to provide a head covering system made up of lightweight, easy to pack and carry, and functionally compatible head covering modules and components.

Another object of the invention is to present modules and components that are variously and easily combined.

Another object of the Modular Head Covering System is to provide comfort and protection to the wearer in a wide range of weather and environmental conditions including heat, cold, wind, rain, dust, snow, direct sun from any angle, and insect infestation. The Modular Head Covering System is designed to meet the special conditions encountered while hiking, camping, mountaineering, climbing, horseback riding, hunting, fishing, traveling, gardening, or survival activities.

Another object of the invention is to provide the wearer with a reduced risk from environmental hazards such as hypothermia, hyperthermia, sunburn, dust inhalation, insect poisoning and bite discomfort, and excessive ultraviolet radiation exposure which can contribute to skin cancer.

Another object of the Modular Head Covering System is to provide the wearer with a temperature regulation module, an insect cover module, and a rain cover module.

Temperature Regulation Module

The temperature regulation module is designed to create shade on the face, head, neck, and throat regardless of the angle of the sun, and to offer protection from dust, heat, and cold.

One object of the temperature regulation module is to provide the following components: a visor, a head-encircling member or headband, a headcover, and a pair of side flaps. Further, these components are to function co-operatively with one another to create, as needed, shade, ventilation, and/or insulation. An advantage of the present invention is that the method of securing the temperature regulation module to the head does not decrease its shade-producing capabilities.

Another object of the temperature regulation module is to provide a versatile scarf-like headcover that can be comfortably worn under the headband to retain body heat, or over the headband to provide shade while allowing excess body heat to dissipate.

Another object of the temperature regulation module is to provide a headcover that, when worn under the headband, creates a covering over the crown of the head. This covering can be as deep or shallow as needed depending upon the size of the wearer's head or how the wearer has positioned the headband.

One function of the temperature regulation module is to provide a headcover with a closure device of unique configuration that allows the wearer to arrange and secure the headcover in varying ways in order to keep the face and throat in shade.

One object of the temperature regulation module is to provide side flaps which can be wrapped around the head for warmth or over the nose and mouth for protection from dust. Side flaps can also be placed further back on the head, or further forward. They can be worn under helmets such as those worn by kayakers, bikers, riders, and climbers.

One object of the temperature regulation module is to create layers of fabric for insulation by providing for the use of the headcover and side flaps at the same time.

One object of the temperature regulation module is to function co-operatively with the insect cover module and the rain cover module to provide protection from sun, wind, cold, or dust in conditions where there may also be insects present and/or precipitation.

Insect Cover Nodule

One object of the insect cover module is to protect the face, head, and upper torso of the wearer from insects. The insect cover module is not attached to any other garment. However, it is designed to function compatibly with the visor of the temperature regulation module. Extra wires and devices are not necessary to hold the insect cover module away from the face of the wearer.

Another object of the insect cover module is to provide an insect-excluding head covering that depends from the visor of the temperature regulation module creating a protected area around the face of the wearer.

Another object of the insect cover module is to allow access to the wearer's face by way of an easily opened and closed panel. If the panel is barely opened, a straw can pass through and the wearer can enjoy a hot or cold drink without exposing any protected areas. If the panel is opened all the way, it flips up above the visor so that the wearer can eat, drink, or see more clearly.

Another object of the insect cover module is to provide the wearer with a head-encircling member that can be worn over the insect cover material to create more loft or under the insect cover material to create more ventilation.

Another object of the insect cover module is to provide a comfortable provision for the shoulder straps found on backpack-like carrying devices. The insect cover module has closures along each side which can be opened to pass a strap through and then re-sealed around the strap. Thus, on the front of the wearer's body, the straps lie under the insect cover module. This provides the wearer with a greater range of motion while maintaining an insect-proof seal.

Another object of the insect cover module is to function co-operatively with the temperature regulation module and/or the rain cover module to provide protection from insects when it is also hot, cold, sunny, shady, rainy, dry, or humid.

Rain Cover Module

One object of the rain cover module is to protect the wearer from precipitation and wind. The rain cover module is not attached to any other garment, such as a coat. However, it is designed to function compatibly with the visor of the temperature regulation module. Extra wires or devices are not necessary to hold the rain cover module away from the face of the wearer.

One advantage of the rain cover module of the present invention is that it allows the wearer to look to the side without loss of visibility and without exposing the side of the face and head to precipitation.

Another object of the rain cover module is to create a rainproof head covering that exposes no seams to direct precipitation.

Another object of the rain cover module is to provide a rainproof head covering that depends from the visor of the temperature regulation module creating a sheltered area around the face of the wearer. Thus, eyeglasses are protected from precipitation.

One object of the rain cover module is to present a water-proof head covering of a tent-like shape to shunt water off the shoulders. Underarm fastening devices hold the bottom edge in place across the upper arm to maintain the tent-like shape.

Another object of the rain cover module is to provide a rainproof head covering that, while covering the head, can extend rearward and cover the top of the wearer's backpack. This protects the wearer's upper back which is difficult to keep dry when wearing a backpack in the rain.

Another object of the rain cover module is to provide a built-in storage bag which keeps the rain cover module itself neatly tucked away and also has room to contain the insect cover module and the flexible fabric parts of the temperature regulation module. The storage bag can be hung from a pack or belt using its loop and hook. The visor/headband can clip through the loop. Since the visor/headband is the most often used combination of components, it is an advantage to have it so easily accessible.

Another object of the rain cover module is to function cooperatively with the insect cover module and the temperature regulation module to provide protection from precipitation, wind or water spray when it is also hot, cold, sunny, humid, or when biting insects are present.

Still further objects and advantages will become apparent from a consideration of the ensuing description and drawings.

DRAWING FIGURES

FIG. 7 is an exploded sectional view taken along the line 9—9 of FIG. 6.

FIG. 8 is a detailed view of the pocket and the headcover-to-headband articulation.

FIG. 10 is a front perspective view of the headcover showing its position when placed upon the head, and showing the side inches and the throat closure mechanism.

FIG. 11 is a side perspective view of the headband worn with the visor, and a visor-to-headband fastening device in the form of a zipper.

FIGS. 17*a* and 17*b* are partial front perspective views showing headcover notch options.

Figure 18:
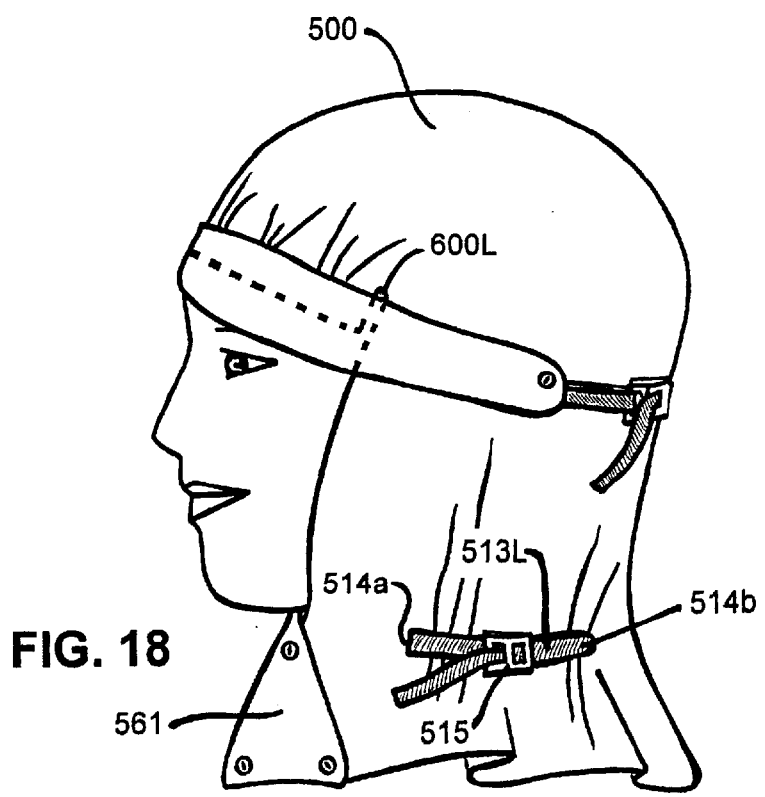

FIG. 18 is a side perspective view showing the headcover with side cinches being worn in combination with the headband.

FIGS. 19*a* through 19*d* are detailed views of headcover throat closure overlap fastening options.

FIG. 20 is a side perspective view of the headcover snapped above the visor.

REFERANCE NUMERALS OVERVIEW

| 100 | TEMPERATURE REGULATION MODULE | 10 | Main Parts |
|---|---|---|---|
|  |  | 20 | Edges |
| 200 | Visor | 30 | Closures |
| 300 | Headband | 40 | Points/Corners |
|  | 400 Pockets | 50 | Casings |
| 500 | Headcover | 60 | Overlaps |
|  | 600 Notches | 70 | Attachment Devices |

| REFERENCE NUMERALS IN DRAWINGS | |
|---|---|
| TEMPERATURE REGULATION MODULE HAT | 100 |
| Visor | 200 |
| Brim | 201 |
| Visor Underside Material Piece | 211 |
| Visor Topside Material Piece | 212 |
| Visor Stiffener | 214 |
| Outer Rim Edge | 221 |
| Inner Rim Edge | 222 |
| Visor Zipper | 272 |
| Visor Hook and Loop Fastener | 274 |
| Headband | 300 |
| Headband Material Piece | 311 |
| Headband Buckle | 312a, 312b |
| Headband Straps | 313a, 313b |
| Elastic Pieces | 314a, 314b |
| Interfacing | 315 |
| Headband Liner | 316 |
| Liner Material Piece | 317 |
| Padding | 318 |
| Headband Superior Edge | 321 |
| Headband Inferior Edge | 322 |
| Headband Interior Surface | 323 |
| Headband Exterior Surface | 324 |
| Headband Liner Interior Surface | 325 |
| Headband Liner Exterior Surface | 326 |
| Hat Retention Device | 370 |
| Hat Retention Loops | 371R, 371L |
| Headband/Visor Zipper | 372 |
| Headband/Visor Hook and Loop Fastener | 374 |
| Headband/Head Cover Fastening Device | 375 |
| Hat Retention Hooks | 377R, 377L |
| Hat Retention Straps | 378R, 378L |
| Sliding Adjuster | 379 |
| Crown Opening | 381 |
| Pocket |  |
| Headcover | 500 |
| Headcover Material Piece | 511 |
| Facing | 512 |
| Side Cinches | 513R, 513L |
| Side Cinch Straps | 514a, 514b |
| Side Cinch Buckle | 515 |
| Superior Convex Edge | 521 |
| Side Edges | 522R, 522L |

-continued

| REFERENCE NUMERALS IN DRAWINGS | |
|---|---|
| Bottom Edge | 523 |
| Throat Points | 543R, 543L |
| Throat Closure Overlap | 561 |
| Throat Closure Fastening Device | 571 |
| Throat Points Fastening Devices | 573R, 573L |
| Headcover Fastening Device | 575 |
| Face Opening | 581 |
| Notches | 600R, 600L |
| Notch Superior Edge | 621 |
| Notch Inferior Edge | 622 |

DESCRIPTION

Temperature regulation module hat 100 provides protection to the wearer from the sun's ultraviolet rays, wind, cold, or heat. Temperature regulation module hat 100 is primarily constructed of flexible material selected from woven or non-woven types of textiles. The material can be lined, coated, or laminated with ultraviolet, water, or wind blocking substances.

The following is a detailed structural description of each and component.

TEMPERATURE REGULATION MODULE HAT

Figure 1:
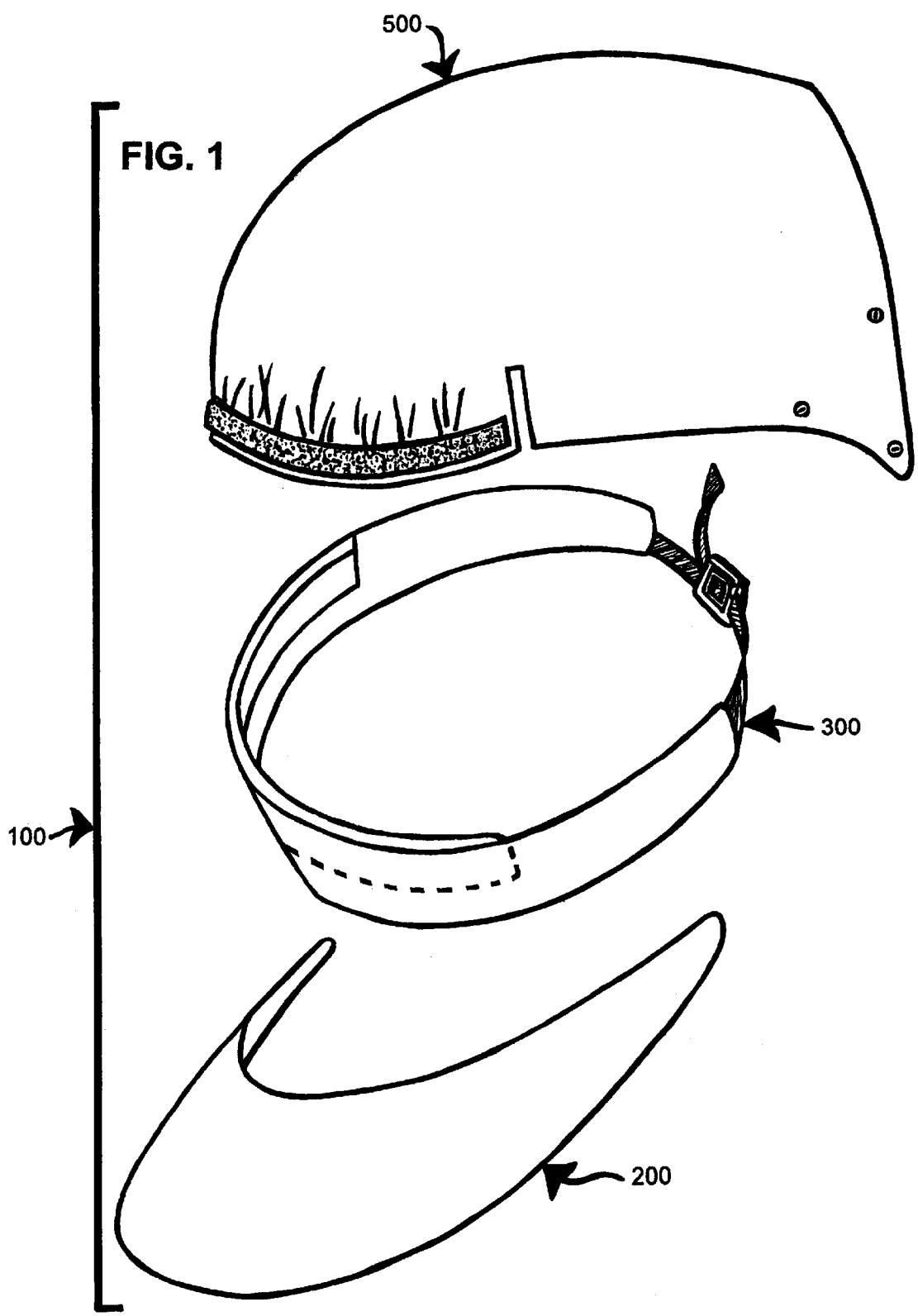
FIG. 1 is an exploded view of the parts comprising the Temperature Regulation Module.

FIG. 1 shows temperature regulation module hat 100 comprising the following components: a visor 200, a headband 300, and a headcover 500, all designed to work together in varying combinations.

Visor

Figure 2:
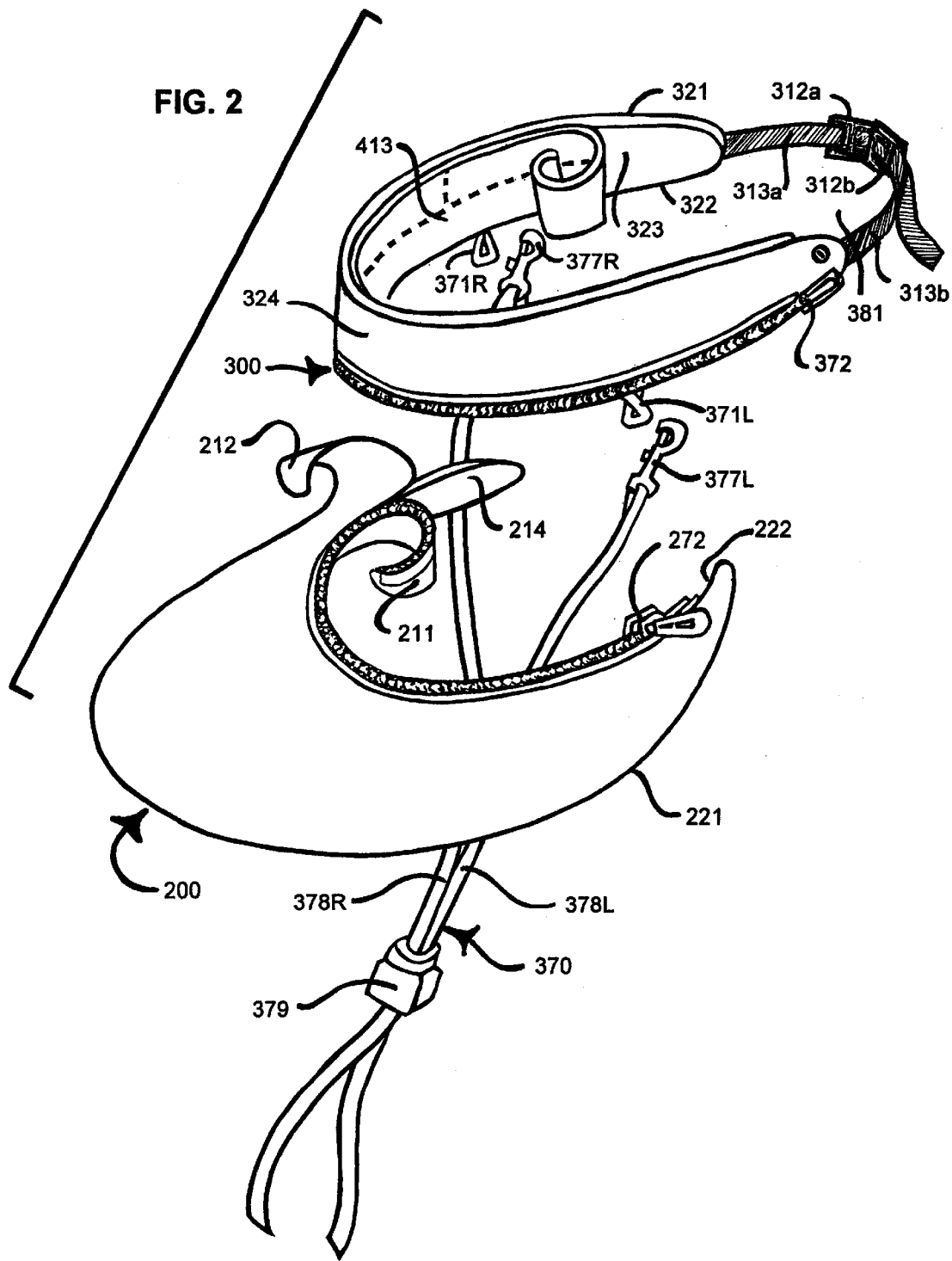
FIG. 2 is an exploded perspective view of the headband and visor.
Figure 3:
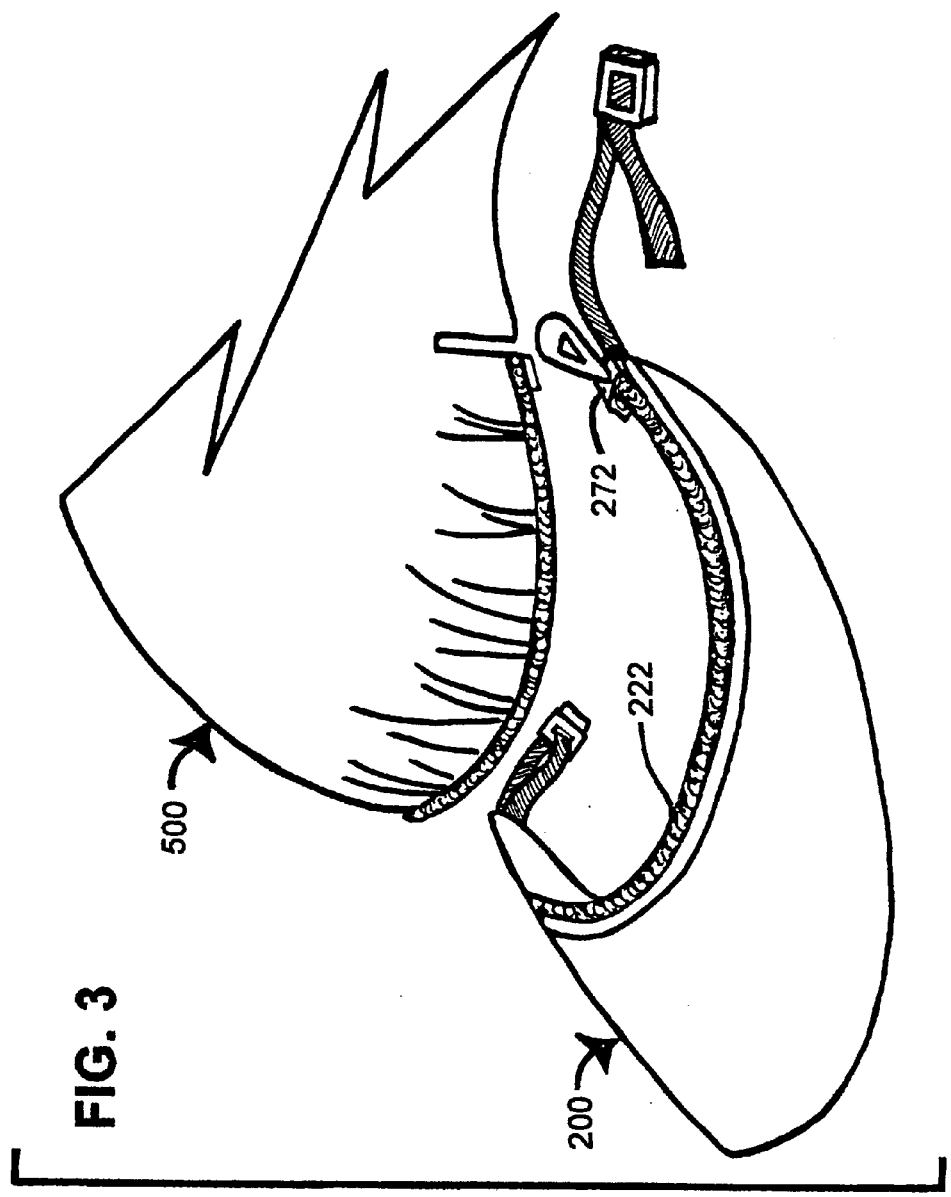
FIG. 3 is an exploded partial view of the headcover-to-visor attachment.

FIG. 2 shows visor 200, of crescent shape, with an outer rim edge 221, an inner rim edge 222. In the preferred embodiment, visor 200 is constructed of a visor stiffener 214 sandwiched between a visor topside material piece 212 and a visor underside material piece 211. Visor 200 is attachable to headband 300 or headcover 500 (see FIG. 3) along inner rim edge 222. The attachment is attained by sewing, by use of a visor zipper 272, or by use of a visor hook and loop fastener 274 (see FIG. 4).

Headband

Figure 5:
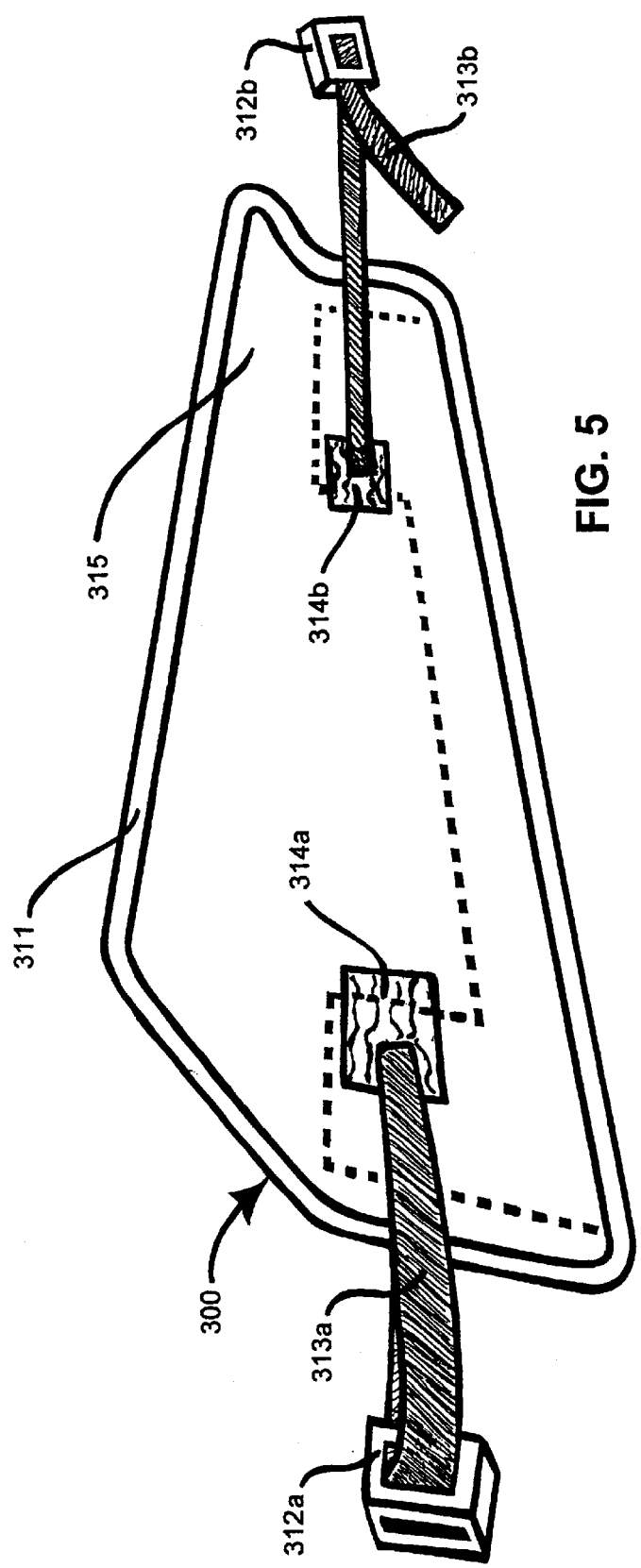
FIG. 5 is a perspective view of the headband showing the front-facing surface lifted to expose the inside parts and surfaces.

FIG. 5 shows headband 300 comprising a headband material piece 311 and a stiffener such as an interfacing 315. Interfacing 315 is sewn or fused to headband material piece 311.

Headband 300 further includes a headband buckle 312a, 312b which is two-piece and releasable. Each half of headband buckle 312 is attached to one of a pair of headband straps 313a and 313b, and headband straps 313a and 313b are attached to a pair of elastic pieces 314a and 314b. Elastic pieces 314a and 314b are stitched to headband material piece 311 through interfacing 315. Headband material piece 311 is then folded in half lengthwise.

FIG. 2 shows headband 300 folded in this manner, and with headband buckle 312a, 312b connected. Thus, headband 300 presents a circular shape with a crown opening 381, a headband superior edge 321, a headband inferior edge 322, a headband interior surface 323, and a headband exterior surface 324.

FIG. 2 also shows headband 300 provided with a hat retention device 370 that attaches to a pair of hat retention loops 371R and 371L. Hat retention loops 371R and 371L depend from headband inferior edge 322. Hat retention device 370 consists of a pair of hat retention hooks 377R and 377L attached to a pair of hat retention straps 378R and 378L held together by a sliding adjuster 379 which can be cinched up to the chin of the wearer.

FIG. 2 also shows headband 300 attachable to visor 200 along headband inferior edge 322 and visor inner rim edge 222. Attachment can be attained by sewing together or with a detachable fastening device such as a headband/visor zipper 372 or, as shown in FIG. 4, a headband/visor hook and loop fastener 374.

Figure 4:
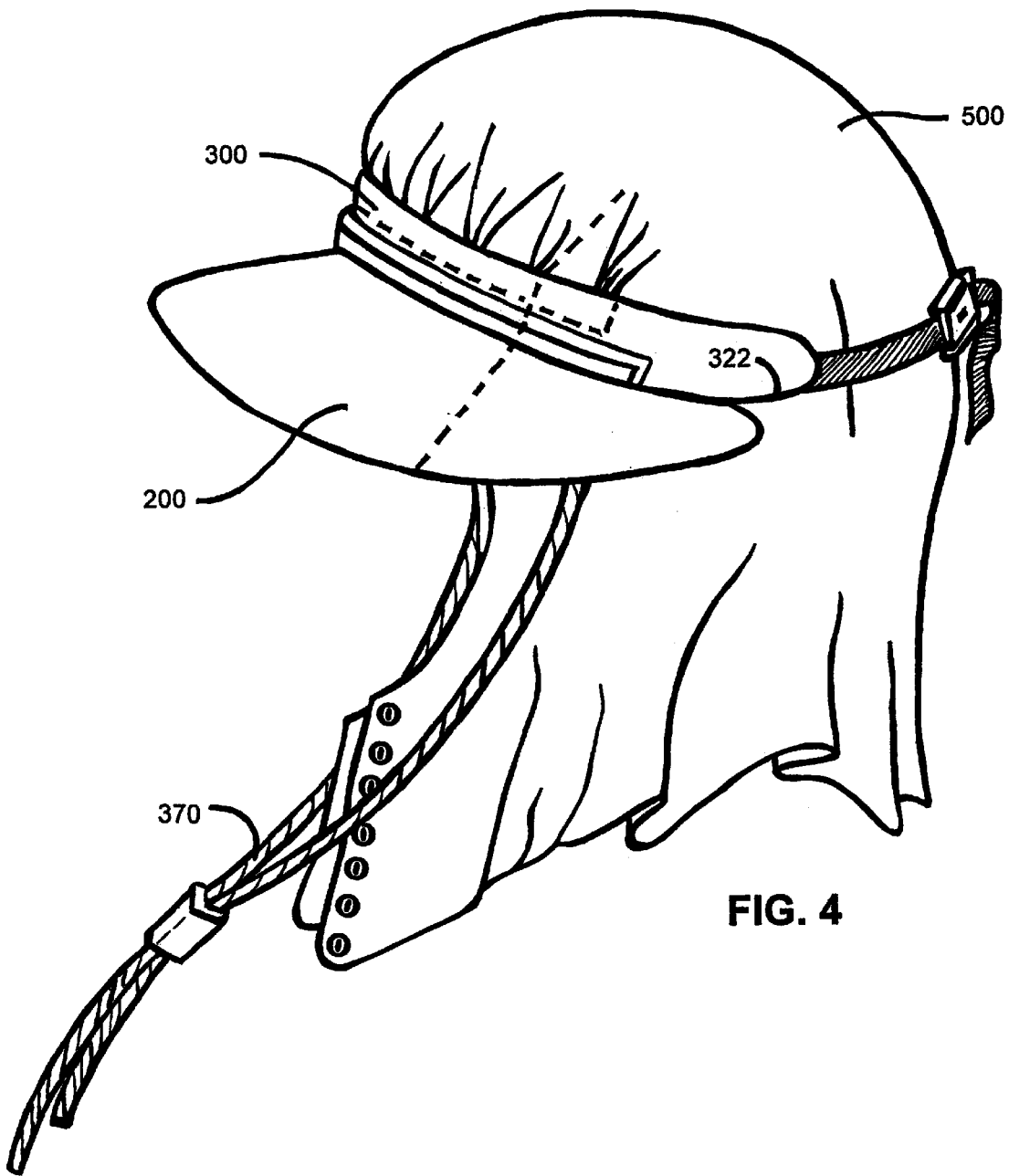
FIG. 4 is a side perspective view of the Temperature Regulation Module.

FIG. 4 shows headband 300 connected to visor 200.

Figure 6:
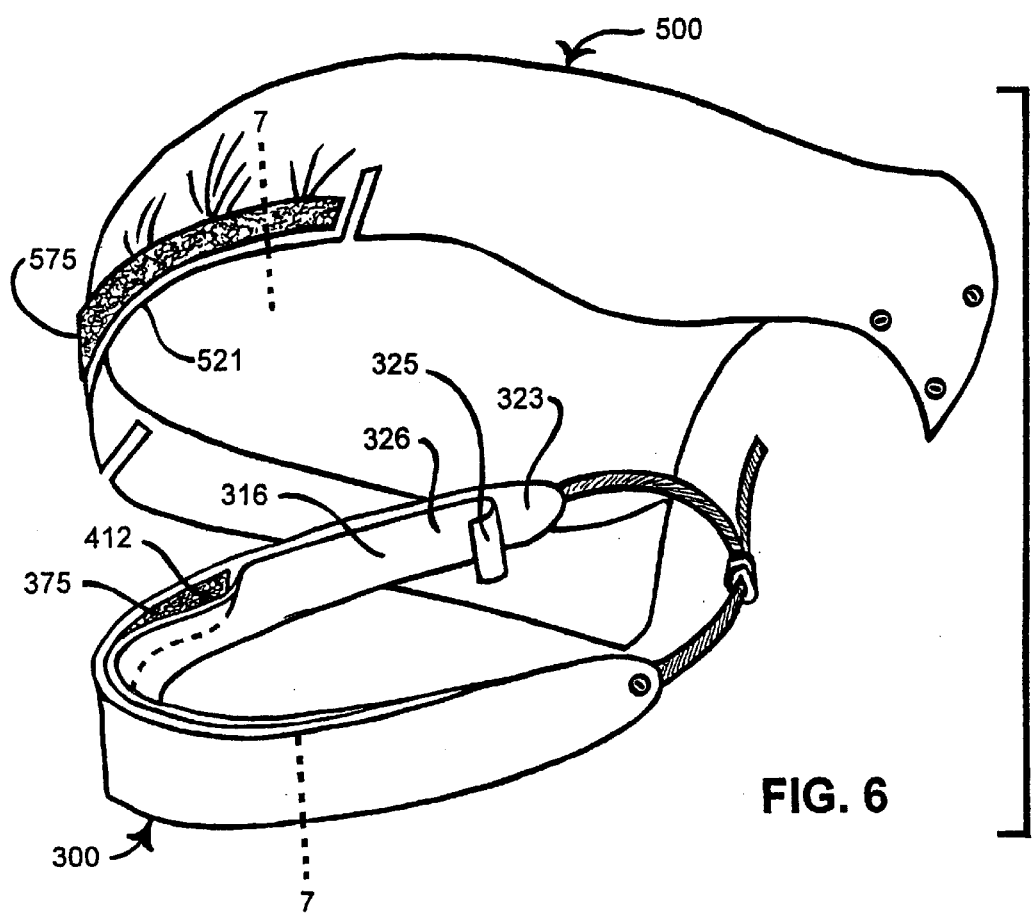
FIG. 6 is an exploded perspective view of the headcover and headband.

Between headband interior surface 323 and the wearer's head is a headband liner 316 as illustrated in FIGS. 6 and 7. Headband liner 316 is comprised of a headband liner material piece 317 which can be folded to encase a padding 318 to protect the wearer from fastening devices. Headband liner 316 has a headband liner interior surface 325 and a headband liner exterior surface 326.

A pocket 412 is centered across the forehead, accessed from above, and is designed to accept headcover 500 (see also FIG. 8). A headband/headcover fastening device 375 such as hook and loop fastener, zipper, buttons, snaps, or snap tape is attached to headband interior surface 323 inside upper pocket 412.

Headcover

Figure 9:
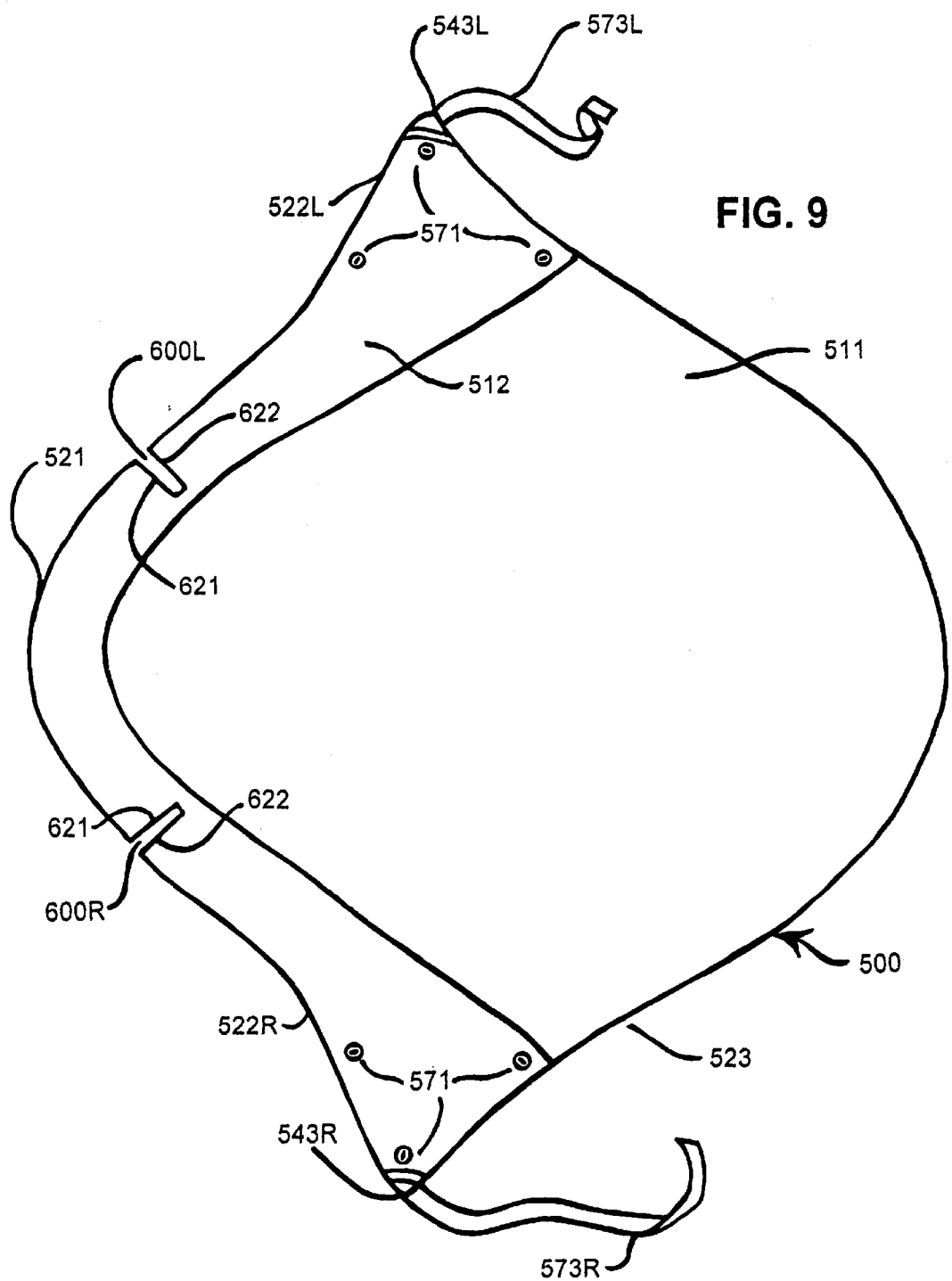
FIG. 9 is a plan view of the underside of the headcover showing the facing and the placement of the notches.

FIGS. 9 and 10 show headcover 500 comprising a headcover material piece 511 and a facing 512, both of flexible material. Headcover 500 has the following edges: a superior convex edge 521, a pair of side edges 522R, 522L, and a bottom edge 523. Superior convex edge 521 terminates on both sides at approximately the temples of the wearer, where a pair of notches 600R, 600L is created by slits cut into headcover 500. In the preferred embodiment, notches 600R, 600L each has a notch superior edge 621 and a notch inferior edge 622. However, it should be noted that any reasonable configuration of slits or cutout sections is within the scope of the invention. Side edges 522R, 522L originate at notches 600R, 600L and terminate at a pair of throat points 543R, 543L created where side edges 522R, 522L intersect with bottom edge 523. Facing 512 lines headcover material piece 511 along the edges that frame the face and neck of the wearer.

FIG. 10 shows superior convex edge 521 gathered between notches 600R, 600L to conform to the shape of a human head.

FIGS. 6, 7, and 8 show headband 300-to-headcover 500 articulations. Superior convex edge 521 provides a location for a headcover fastening device 575 such as hook and loop fastener, zipper, buttons, snaps, or snap tape.

FIG. 10 shows a pair of side cinches 513R, 513L each consisting of a pair of side cinch straps 514a, 514b joined by a side cinch buckle 515. Side cinches 513R, 513L are positioned one on each side of headcover 500 approximately where the neck meets the shoulder of the wearer.

By crossing side edge 522R over or under side edge 522L, a face opening 581 and a throat closure overlap 561 are created. Throat closure overlap 561 provides an area for attachment of a throat closure fastening device 571 such as hook and loop fastener, zipper, buttons, snaps, or snap tape. In the preferred embodiment, throat closure fastening device 571 consists of an equilateral triangle of snaps. A triangle of male snaps is positioned on one side of throat closure overlap 561 and a triangle of female snaps is positioned on the other side of throat closure overlap 561.

Attached to throat points 543R, 543L are a pair of throat point fastening devices 573R, 573L such as cordage or buttons.

OPERATION

The components of the Temperature regulating Modular Habs are designed to work intimately together in a variety of combinations to provide protection from the elements and insects. The Temperature regulating modular Habs can be used in many ways, depending on the weather conditions, environmental factors, or the needs or mood of the wearer. The uses are detailed in the following operational description.

TEMPERATURE REGULATION MODULE HAT

Temperature Regulating modular Hat 100 includes the following components as shown in FIG. 5: visor 200, headband 300, headcover 500.

Headband

Headband 300 is a head-encircling member and is attachable to, and releasable from, any of the remaining components, best illustrated in FIG. 2. Headband 300 can be worn alone to warm the ears or to hold the wearer's hair in place in windy conditions. Headband 300 can be constructed of moisture-absorbent fabrics and worn as a sweatband.

To wear headband 300, headband strap 313a with one side of headband buckle 312a is connected to its mate headband strap 313b with the other side of headband buckle 312b. Headband strap 313b is pulled to tighten. Enclosed elastic pieces 314a and 314b provide for a tighter fit (see FIG. 5).

FIGS. 2 and 4 show hat retention device 370 which can be employed during high winds to secure headband 300 to the head, particularly when headband 300 and visor 200 are connected, as discussed below. To employ hat retention device 370, connect hat retention hooks 377R and 377L to hat retention loops 371R and 371L and snug sliding adjuster 379 up to the chin. To remove, simply disconnect hat retention hooks 377R and 377L.

FIG. 11 shows headband 300 worn with visor 200 only. When worn in this fashion the wearer's head emerges from crown opening 381 allowing for maximal heat loss and ventilation, while still shading the face.

FIG. 6 shows headband 300 equipped with upper pocket 412 which provides a location for the attachment of headcover 500 (see also FIG. 8). Pocket is created by stitching pattern 412 headband liner 316 to headband interior surface 323. Headband liner 316 also protects the wearer's head from fastening devices.

Visor

Figure 12:
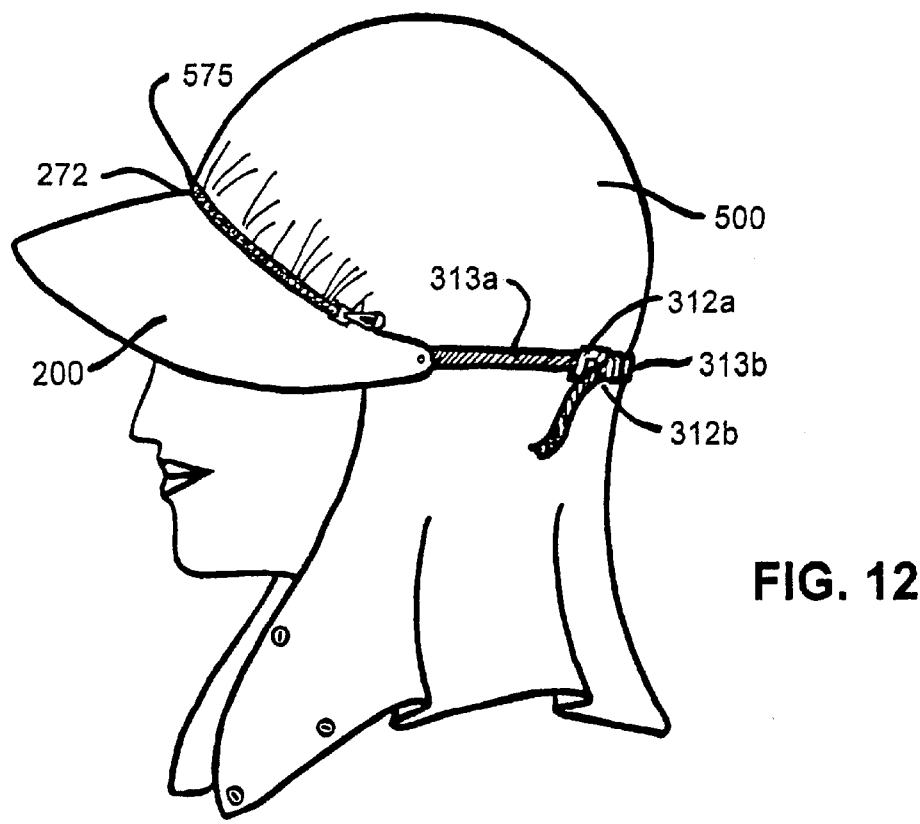
FIG. 12 is a side perspective view showing a person wearing the visor and the headcover and showing the visor as a head-encircling member.

FIGS. 11 and 12 show visor 200 which can be employed to shade the face from sun or poorly placed indoor lighting. To attach visor 200 to headband 300, connect visor zipper 272 to headband/visor zipper 372 as shown in FIG. 11, or connect visor hook and loop fastener 274 to headband/visor hook and loop fastener 374 as shown in FIG. 4.

Visor 200 can also be constructed as its own head-encircling member. This can be accomplished in several ways such as: visor 200 can be attached directly to headband strap 313a, 313b and headband buckle 312a, 312b as shown in FIG. 12, or, visor 200 can be expanded to become a brim 201 which completely encircles the head as shown in FIG. 12.

Visor 200, when constructed as its own head-encircling member, can be worn with (see FIG. 12) or without (not shown) headcover 500.

Headcover

Headcover 500 is used when the wearer needs shade, warmth, or wind protection on his/her head, neck, and throat. To employ headcover 500, as shown in FIGS. 6 and 7, open upper pocket 412 on headband 300 and attach headcover fastening device 575 to headband/head cover fastening device 375. In an alternate embodiment, headcover 500 can also attach directly to visor 200 as seen in FIG. 12.

Figure 14:
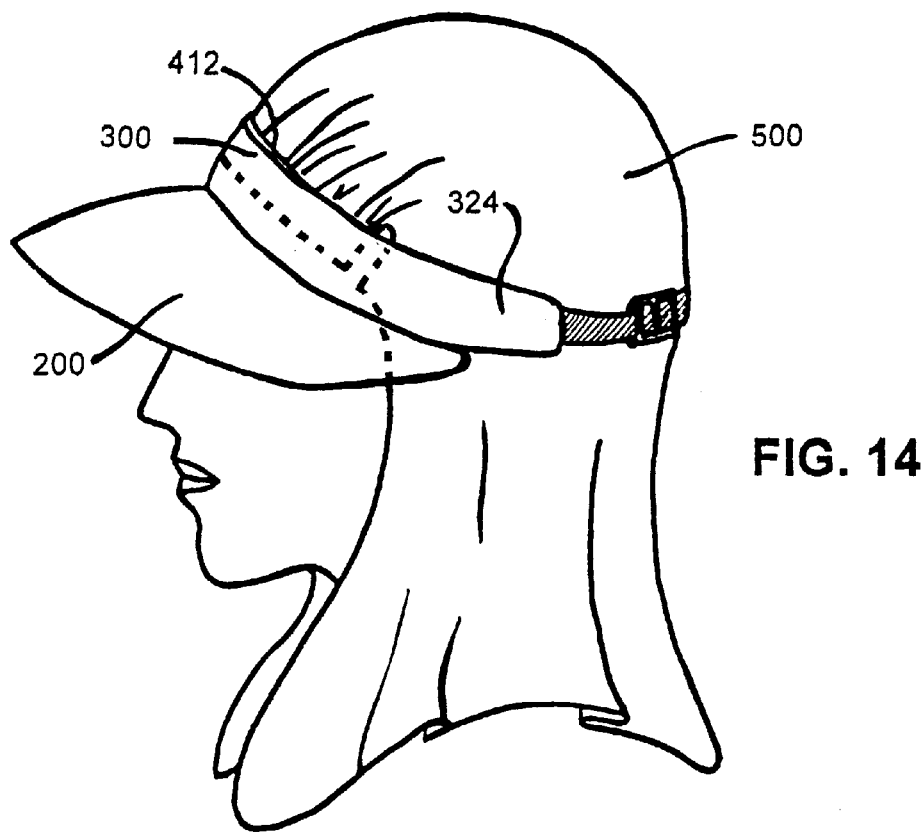
FIG. 14 is a side perspective view of the headcover being worn under the headband.
Figure 15:
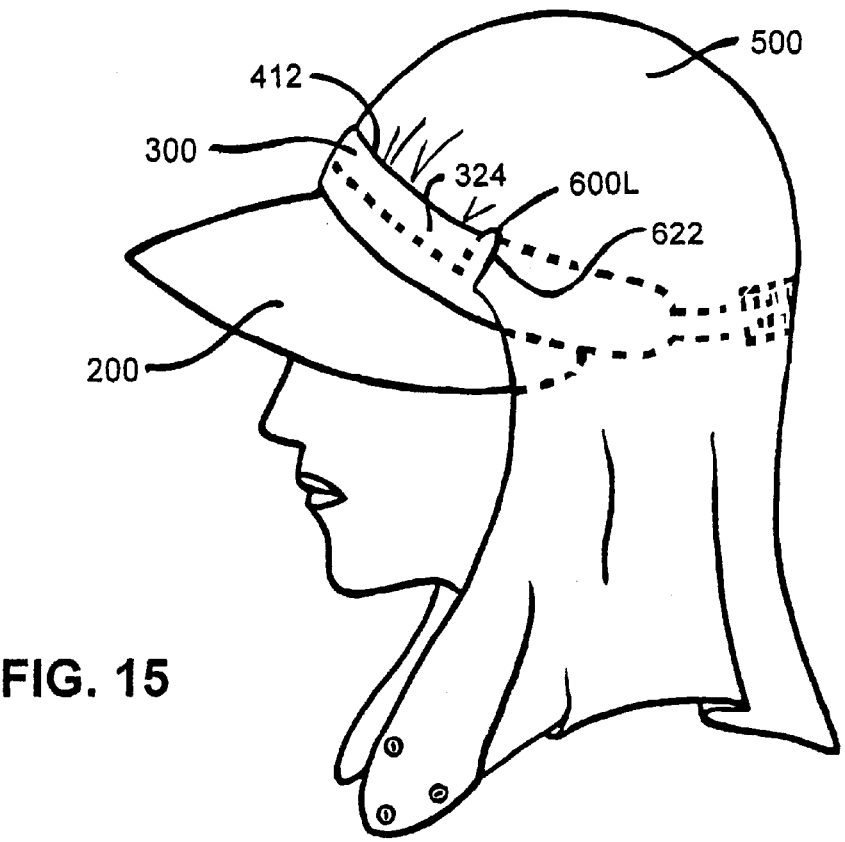
FIG. 15 is a side perspective view of the headcover being worn over the headband.

FIGS. 14 and 15 pertain to notches 600R, 600L in headcover 500. Notches 600R, 600L are crucial to the operation of Temperature Regulating Modular Hat 100. When headcover 500 is attached to headband 300 the attachment terminates on each side at notch 600R or 600L where notch superior edge 621 fits into pocket 412 and notch inferior edge 622 remains outside pocket 412. It is important to understand that notch inferior edge 622 can then be placed in one of two possible positions that are determined by the placement of headcover 500 over headband 300 as seen in FIG. 30 or under headband 300 as seen in FIG. 14. If headcover 500 is placed over headband 300, notch inferior edge 622 lies flat along headband exterior surface 324. If headcover 500 is placed under headband 300 then notch inferior edge 622 lies flat along headband liner interior surface 325 (see also FIG. 8). If the wearer needs to retain body heat, as in cool weather, headcover 500 is placed under headband 300, as shown in FIG. 14. If the wearer needs more ventilation, as in warm weather, headcover 500 is placed over headband 300, as shown in FIG. 15.

Figure 16:
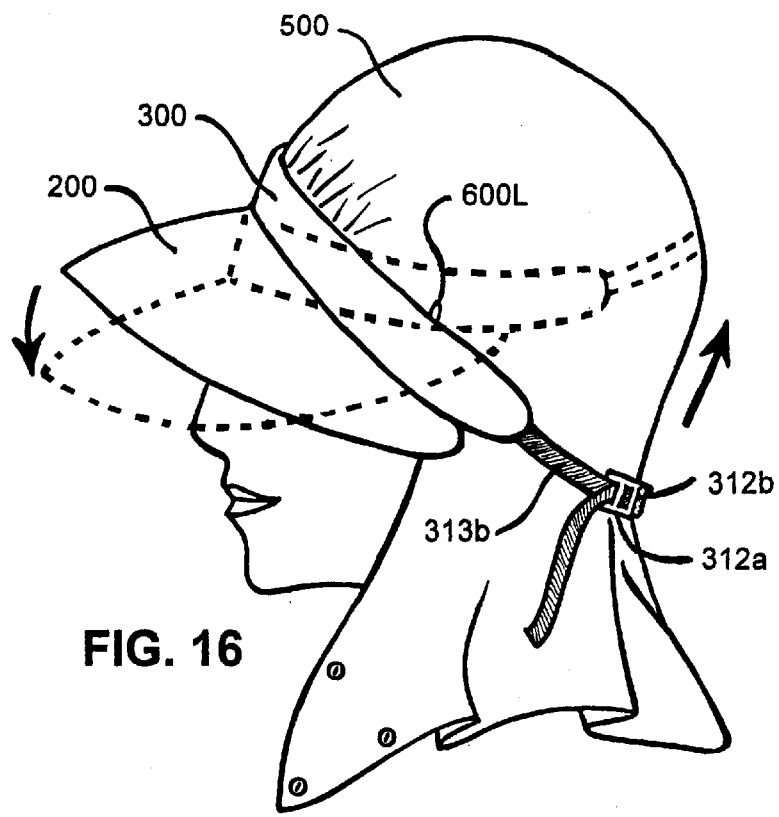
FIG. 16 is a side perspective view indicating the variable crown depth and placement possibilities of the headband and visor as they relate to the headcover.

FIG. 16 shows headcover 500 attached to visor 200/ headband 300 and placed upon the head of the wearer. Headcover 500 and headband 300 are attached to one another only between notches 600R and 600L. Therefore, headband 300 and headcover 500 can move independently of one another. This novel feature allows the wearer to position the visor at an angle appropriate to the sun, and to raise or lower the position of headband 300 on the back of the head, thereby altering the depth of the crown. Consequently, visor 200 can be worn high up on the wearer's forehead or low down over the wearer's eyes. Also, headband 300 can be worn low and under the occipital protrusion of the skull or, high up on the back of the head creating more air space between the back of the head and headcover 500.

FIGS. 17a and 17b show alternate embodiments created by varying the length of notch inferior edge 622R, 622L which increases or decreases the amount of fabric available to protect the face.

FIGS. 10 and 18 show side cinches 513R, 513L which can be employed to seal out drafts. On each side, employ side cinch buckle 515 and pull on side cinch strap 514a or 514b to tighten. To release, unbuckle side cinch buckle 515 or simply loosen side cinch strap 514a or 514b.

FIG. 18 and FIGS. 19a through 19d show throat closure overlap 561 which provides an area for attachment of headcover throat closure fastening device 571. In the preferred embodiment, throat closure fastening device 571 creates an equilateral triangle of snaps. FIGS. 19a through 19d illustrate how, by joining one, two, or three snaps, or by rotating the triangle of male snaps as it relates to the triangle of female snaps, a plurality of closure configurations is possible.

In any of its possible closure configurations, throat closure overlap 561 can be placed in front of the throat, as shown in FIG. 18, behind the neck (not shown), or resting on top of visor 200 as shown in FIG. 20. These options allow the wearer to create shade as needed, retain warmth, or create a fashionable look.

Figure 13:
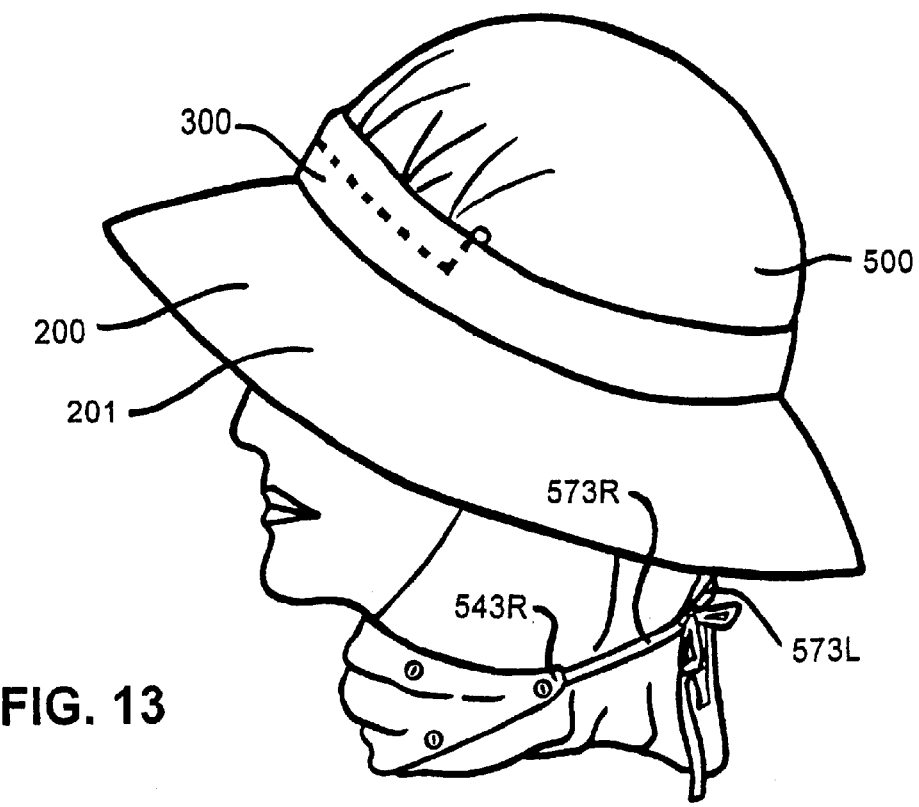
FIG. 13 is a side perspective view showing the visor expanded to encircle the head and the headcover throat points wrapped around the neck.

FIG. 13 shows throat closure points 543R, 543L wrapped around the neck like a scarf and then tied using throat points fastening devices 573R, 573L.

FIGS. 14 and 18 show embodiments which can be adapted for cold weather conditions. Headcover 500 can be made of warm fabric or multiple layers of fabric such as, but not limited to, wind-proof nylon lined with polar fleece. With headcover 500 attached to visor 200/headband 300, as shown in FIG. 14, the wearer is prepared for cold, sunny conditions. Headcover 500/headband 300 can also be used without visor 200 as shown in FIG. 18. This option is appropriate for cold conditions after sunset or for wearing while sleeping.

Temperature Regulating Modular Hat

RAMIFICATIONS, CONCLUSION, AND SCOPE

Accordingly, the reader will see that the modules and components of the function co-operatively in a plurality of possible combinations. In addition, a combination or arrangement of parts is possible to protect the wearer under any conditions normally encountered in the out-of-doors. Further, the reader will see that the Temperature regulating Modular Hat of the Modular Head Covering System provides the wearer with a heretofore unseen degree of environmental protection as part of a light-weight, easy to pack and carry, comprehensive head covering system for people living, working, or recreating outdoors.

Although the description above contains many specificities, these should not be construed as limiting the scope of the invention, but as merely providing illustrations of some of the present preferred embodiments of this invention. Many other variations are possible.

For example: All and components could provide surfaces for logos, indices, printed messages, or advertisements or could be made of tie-dyed, decorative, patterned, or specialty-printed fabrics for specific events or target markets such as gardeners, golfers or painters.

The Temperature regulating Modular Hat could be constructed of special fabrics for specific conditions such as, for ventilation: cotton, hemp, linen, rayon, for insulation, warmth or wind protection: flannel, silk, down-filled cloth, wool, polar fleece, sheepskin, leather, polypropylene, polyester, or nylon, for protection from insect netting or other insect proof fabrics, for protection from water: coated, laminated or treated fabrics, for protection from ultraviolet radiation: fabrics of dense weave, specialty fabrics with sun protection factor ratings, coated or treated ultraviolet radiation blocking fabrics, or any combination of the above textiles.

The headcover could attach to the head-encircling member by any length of attachment from a one-spot attachment such as a button or snap, to an attachment along the entire head-encircling member.

The headcover could be constructed of two or more pieces of fabric joined by seams to create a rounded head-shaped crown and to eliminate the need for gathers along the attachment edge.

The headcover could be constructed with two or more layers of fabric such as flannel covered by polar fleece covered by wind-proof nylon.

These layers could be attached to one another around the entire periphery, or only along the superior edges. Thus, the wearer could position some layers under the head-encircling member and some layers over the head-encircling member. Also, the wearer could employ multiple layers for insulation.

The headcover and side flaps could be made long and cape-like, or with provision for the wearer's arms like a shirt or jacket.

The visor could be made of an uncovered stiff material such as plastic or neoprene. The visor and headband could be constructed of one piece of material.

The attachment devices referred to in the specifications could be hook and loop fasteners, zippers, snap tape, snaps, strings grommets, buttons, or any other suitable fastening devices.

Accordingly, the scope of the invention should be determined not by the embodiments illustrated, but by the appended claims and their legal equivalents.

We claim:

1. An article of apparel for the head, comprising
   (a) a headcover of flexible material,
   (b) a head-encircling member,
   (c) said headcover being attached to said head-encircling member,
   (d) said attachment terminating where a pair of notches are cut into said headcover,
   (e) said notches having superior and inferior edges,
   (f) said superior edges of said notches terminating the connection of said headoover to said head-encircling member,
   (g) said inferior edges of said notches and said headcover being unattached and free to lie on either side of the head-encircling member,
   whereby a wearer can choose to wear the headcover over or under the head-encircling member so that the head-encircling member and the headcover move independently of one another.

2. The article of apparel of claim 1 wherein a pocket is constructed in the head-encircling member which houses a fastening device which is used to attach said headcover the said head-encircling member.

3. The article of apparel of claim 1 wherein said headcover and said head-encircling member are detachable from one another.

* * * * *